(12) United States Patent
Lee et al.

(10) Patent No.: US 8,593,561 B2
(45) Date of Patent: Nov. 26, 2013

(54) CAMERA MODULE AND METHOD FOR FABRICATING THE SAME

(75) Inventors: Li-Kai Lee, Taipei County (TW); Yu-Kun Hsiao, Hsinchu County (TW)

(73) Assignees: Omnivision Technologies, Inc., Santa Clara, CA (US); Visera Technologies Company Limited, Hsinchu (TW)

( * ) Notice: Subject to any disclaimer, the term of this patent is extended or adjusted under 35 U.S.C. 154(b) by 517 days.

(21) Appl. No.: 13/037,876

(22) Filed: Mar. 1, 2011

(65) Prior Publication Data

US 2012/0224094 A1     Sep. 6, 2012

(51) Int. Cl.
*H04N 5/225* (2006.01)
*H01L 21/00* (2006.01)
*H01L 31/0232* (2006.01)
*H01L 23/02* (2006.01)

(52) U.S. Cl.
USPC ............. 348/340; 348/374; 438/69; 257/432; 257/680

(58) Field of Classification Search
None
See application file for complete search history.

(56) References Cited

U.S. PATENT DOCUMENTS

| | | | |
|---|---|---|---|
| 2007/0070228 A1* | 3/2007 | Lee ................................ | 348/294 |
| 2007/0070511 A1* | 3/2007 | Lee et al. ...................... | 359/656 |
| 2007/0166029 A1* | 7/2007 | Lee et al. ...................... | 396/529 |
| 2009/0321863 A1* | 12/2009 | Borthakur et al. ............ | 257/432 |
| 2011/0019077 A1* | 1/2011 | Kobayashi et al. ........... | 348/374 |
| 2012/0075520 A1* | 3/2012 | Tecu ............................. | 348/345 |

* cited by examiner

*Primary Examiner* — Justin P Misleh
(74) *Attorney, Agent, or Firm* — Muncy, Geissler, Olds & Lowe, PLLC

(57) ABSTRACT

A method and system for facilitating focusing of a camera module are disclosed. The camera module includes an image sensor, a lens cube, a barrel and an adjustable member. An adjustable member can be configured to fine-tune the focal length with respect to an image sensor, so that a lens cube with a shorter or longer focal length can be corrected and integrated into the camera module.

15 Claims, 5 Drawing Sheets

CAMERA MODULE AND METHOD FOR FABRICATING THE SAME

BACKGROUND OF THE INVENTION

1. Field of the Invention

The present invention relates to a camera module and a method for fabricating the same, and in particular, to a camera module with a capability for wide lens focal length variations and a method for fabricating the same.

2. Description of the Related Art

The conventional camera module is fabricated by laminating optical lenses on a substrate having optical devices thereon by normal spacers, and then the substrate laminated with the lenses is diced and divided into several individual camera module units. The optical lenses of the conventional camera module usually have focal length variations due to fabrication process variations. Therefore, the resulting camera module using the optical lens having the focal length variations may have image fuzziness or distortion problems because the optical lens is not able to focus directly on the optical device. Accordingly, the conventional focal length compensation method changes a height of the normal spacer to improve the aforementioned problems. However, the total length of the resulting camera module is also changed, thereby affecting the optical performance and reliability thereof.

A novel camera module with a capability for wide lens focal length variations and a method for fabricating the same are desired.

BRIEF SUMMARY OF INVENTION

A compact camera module includes an image sensor, a lens cube, a barrel and an adjustable member. The adjustable member is placed between the lens cube and the barrel and configured to fine-tune the focal length with respect to an image sensor, so that even a lens cube with a shorter or longer focal length can still be corrected and integrated into the camera module. The adjustable member may include glue and compensation balls that can be made of various diameters. The diameters of compensation balls provide the height or thickness of the adjustable member to compensate focal length offset. A method for using an adjustable member to fabricate a compact camera module is demonstrated, including measuring the focal length of the lens cube.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
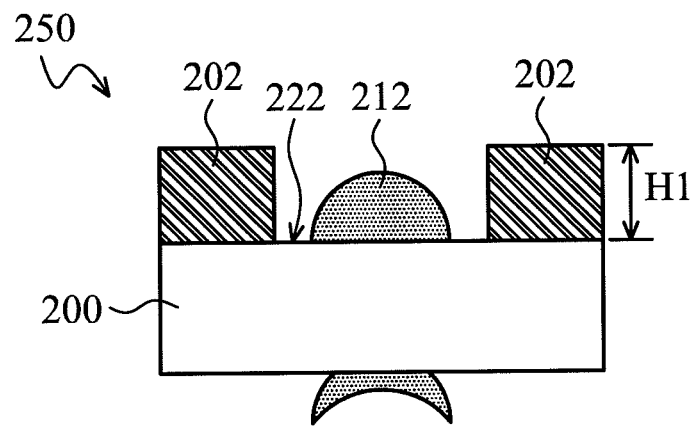
FIGS. 1-4 are cross section views showing one exemplary embodiment of a method for fabricating a camera module of the invention.

The following description is of a mode for carrying out the invention. This description is made for the purpose of illustrating the general principles of the invention and should not be taken in a limiting sense. The scope of the invention is best determined by reference to the appended claims. Wherever possible, the same reference numbers are used in the drawings and the descriptions to refer the same or like parts.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated and not drawn to scale for illustrative purposes. The dimensions and the relative dimensions do not correspond to actual dimensions to practice the invention.

Exemplary embodiments provide a camera module and a method for fabricating the same using an adjustable member including a glue and compensation balls that can be made of various diameters, when bonding a lens cube to a barrel with the adjustable member placed, such that a focus of the lens cube can be fine-tuned with respected to an image sensor by the adjustable member without changing a total height of the camera module. FIGS. 1-4 are cross section views showing one exemplary embodiment of a method for fabricating a camera module 500 of the invention. Please refer to FIG. 1, a lens cube 250 comprises a glass substrate 200 and an optical lens 212. As shown in FIG. 1, the optical lens 212 may comprise a convex lens disposed on a top surface of the glass substrate 200 and a meniscus lens disposed on a bottom surface of the glass substrate 200. It is noted that the optical lens 212 described herein is exemplary only and is not limiting. Alternatively, the optical lens 212 may comprise other lens combinations, for example, the optical lens 212 may not comprise a meniscus lens. The lens cube 250 is first formed by assembling a top spacer 202, which is an optional element of the lens cube 250, on a top surface 222 (also referred to as a light receiving surface 222) of the glass substrate 200. Alternatively, the lens cube 250 is fabricated without assembling with the top spacer 202. As defined and used herein, a "lens cube" relates to an assembly by performing a semiconductor manufacturing technology, which may includes lens replication, stacking, and dicing processes. A lens cube may combine any given numbers of transparent substrates, optical lens, and connecting spacers respectively to fulfill design objectives. In one embodiment as shown in FIG. 1, an aperture of the optical lens 212 of the lens cube 250 is on the top surface 222 of the lens cube 250, surrounded by the top spacer 202. In one embodiment, the top spacer 202 formed of thermal-resistant and reflowable materials such as glass, metals or plastics has a fixed height H1 (i.e. only one size).

Next, referring to FIGS. 1, 5a, 6a and 7a, a measuring process is preformed to measure a focal length of the fabricated lens cube 250, and thus the measuring process mainly measures a focal length of the optical lens 212. Usually, a plurality of the optical lenses 212 is fabricated in the same wafer by a wafer lens process, so that the optical lenses 212 may have a focal length variation due to a process variation.

Figure 5A:
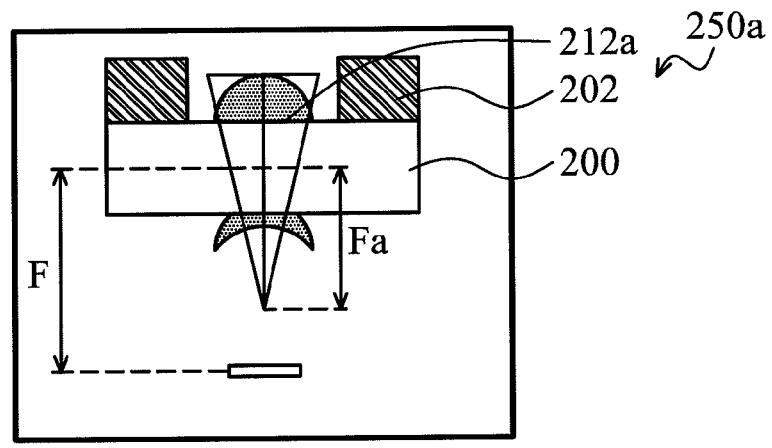
FIGS. 5a-5c are cross section views showing an exemplary embodiment of a compensation diameter selecting method of an adjustable member corresponding to a short focal length lens module.
Figure 6A:
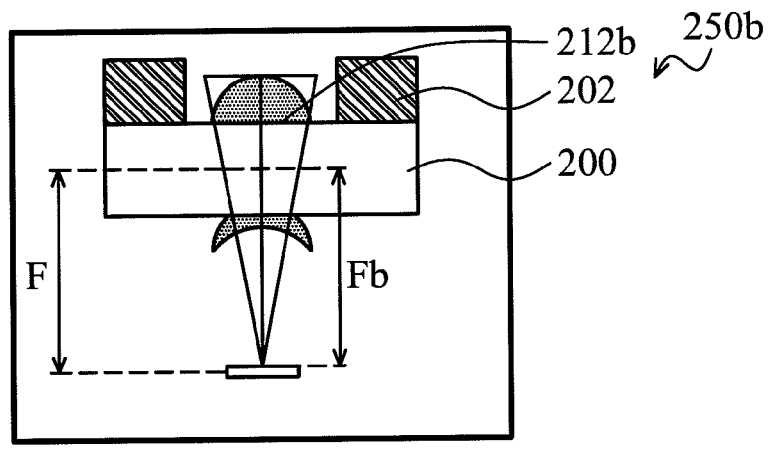
FIGS. 6a-6c are cross section views showing another exemplary embodiment of a compensation diameter selecting method of an adjustable member corresponding to an on focus lens module.
Figure 7A:
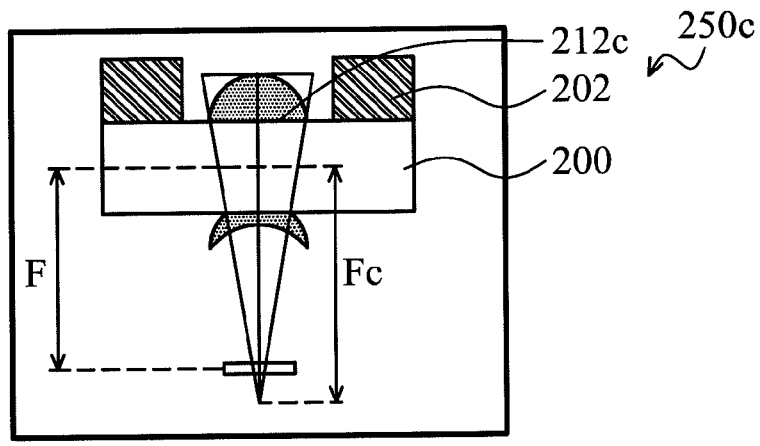
FIGS. 7a-7c are cross section views showing yet another exemplary embodiment of a compensation diameter selecting method of an adjustable member corresponding to a long focal length lens module.

A measured focal length of the lens cube may have three lens classifications of short focal length (FIG. 5a), on focus (FIG. 6a) and long focal length (FIG. 7a) according to a comparison between a measured focal length of the lens cube and a predetermined focal length F of a normal lens cube. The lens classification of short focal length as shown in FIG. 5a, for example, indicates that a measured focal length Fa of a lens cube 250a (an optical lens 212a) is shorter than the predetermined focal length F. The lens classification of on focus as shown in FIG. 6a, for example, indicates that a measured focal length Fb of a lens cube 250b (an optical lens 212b) is the same as a predetermined focal length F. The lens classification of long focal length as shown in FIG. 7a, for example, indicates that a measured focal length Fc of a lens cube 250c (an optical lens 212c) is longer than a predetermined focal length F.

Figure 2:
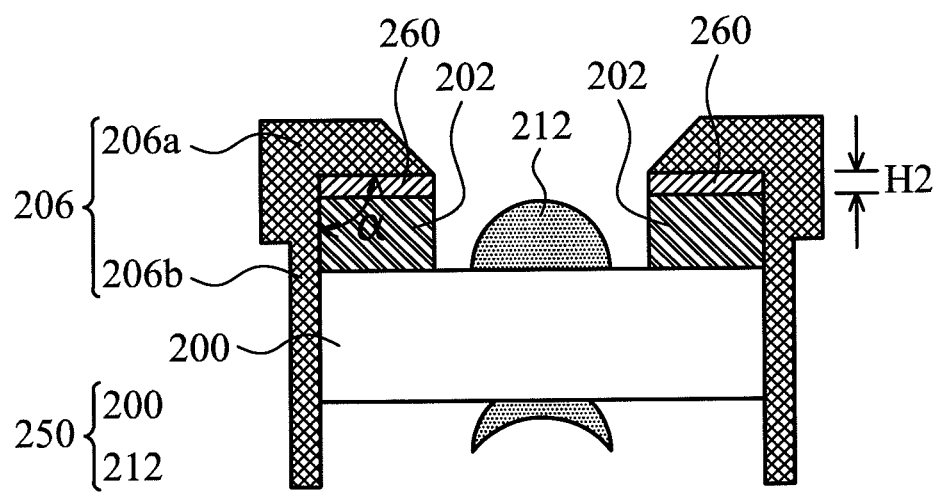
Figure 5B:
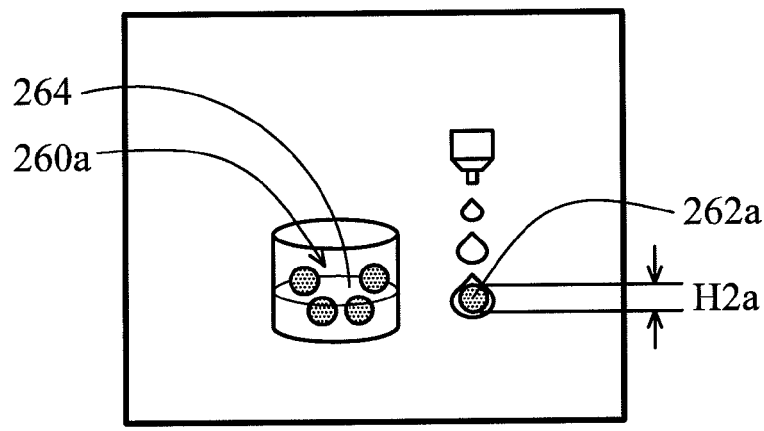
Figure 6B:
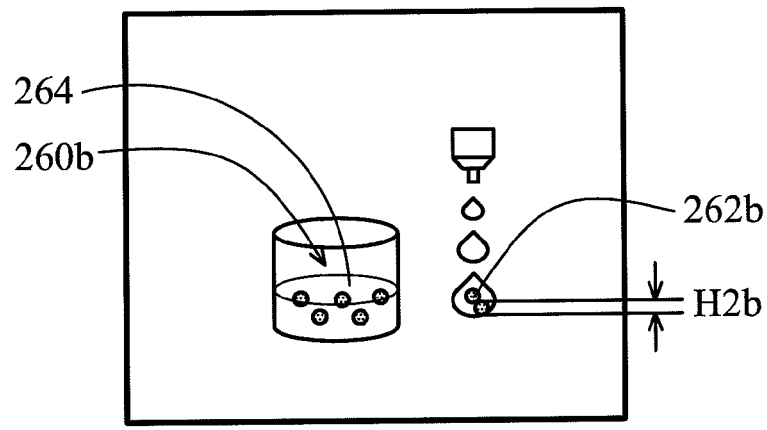
Figure 7B:
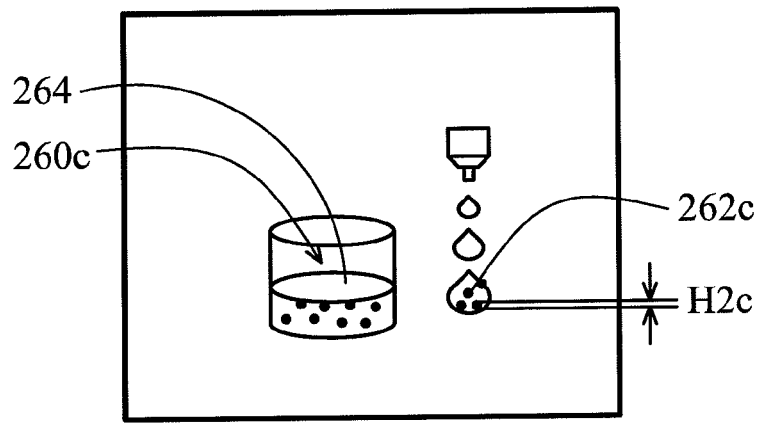

Next, referring to FIG. 2, a bonding process is preformed to bond the top surface 222 of the top spacer 202 to a barrel 206 by an adjustable member 260. Alternatively, due to the top spacer 202 is an optional element, the lens cube 250 may bond to the barrel 206 only through the adjustable member 260. Before performing the bonding process, an adjustable member may be prepared by dispersing at least one compensation ball in a glue. Specifically, the compensation ball of the adjustable member may provide the height or thickness of the adjustable member to compensate a focal length offset of the lens cube 250 such that the lens cube 250 can focus directly on an image sensor assembled in the same package. A diameter of the compensation ball can be adjustable corresponding to the measured focal length of the lens cube 250 (the measured focal length can also correspond to the lens classification of the lens cube 250). For example, as shown in FIGS. 5b, 6b and 7b, at least three adjustable members 260a, 260b and 260c respectively comprising at least one compensation ball 262a, 262b and 262c dispersed in a glue 264 can be prepared to be used in the subsequent bonding process, wherein the adjustable members 260a, 260b or 260c of a diameter H2a, H2b or H2c are respectively corresponding to the lens cube 250a-250c (as shown in FIGS. 5a, 6a and 7a) with three different lens classifications. In one embodiment, the diameter of the compensation ball may be substantially defined by a difference between a predetermined focal length of the lens cube and a measured focal length of the lens cube 250. Such a difference is also referred to as a compensation focal length. For example, if the measured focal length of the lens cube 250 is classified as the short focal length, the adjustable member 260a having a compensation ball 262a with a longer compensation focal length H2a can be selected for the subsequent bonding process. Further, if the measured focal length of the lens cube 250 is classified as the on focus, the adjustable member 260b having the compensation ball 262b with a normal compensation focal length H2b can be selected for the subsequent bonding process. Moreover, if the measured focal length of the lens cube 250 is classified as the long focal length, the adjustable member 260c having the compensation ball 262c with a shorter compensation focal length H2c can be selected for the subsequent bonding process.

Still referring to FIG. 2, after preparing the adjustable member 260 with the compensation ball having the diameter corresponding to the compensation focal length, the adjustable member 260 is disposed on the top surface of the lens cube 250 and spaced apart from the optical lens 212. Next, the barrel 206 is pressed on the top surface of the lens cube 250. That is to say, the compensation ball is placed between the lens cube 250 and the barrel 206. Next, the adjustable member 260 is cured, to complete the bonding process for the lens cube 250 and the barrel 206. As shown in FIG. 2, the lens cube 250 is bonded in an upper portion of the barrel 206, wherein the aperture 212 of the lens cube 250 is exposed from the barrel 206.

Figure 3:
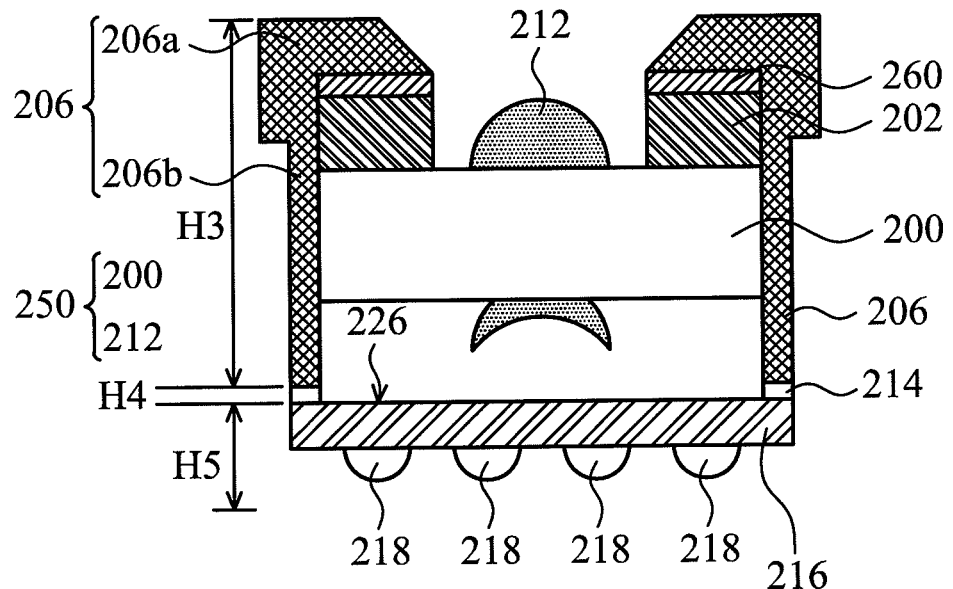
Figure 5C:
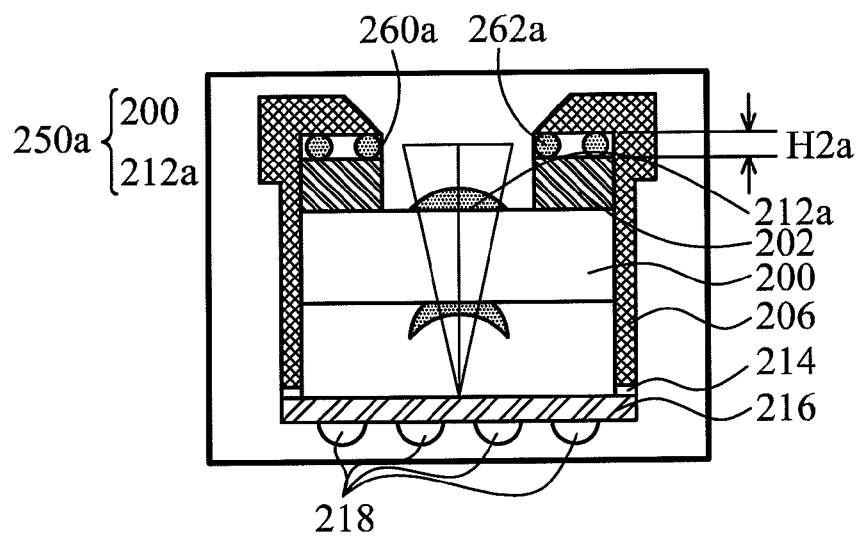
Figure 6C:
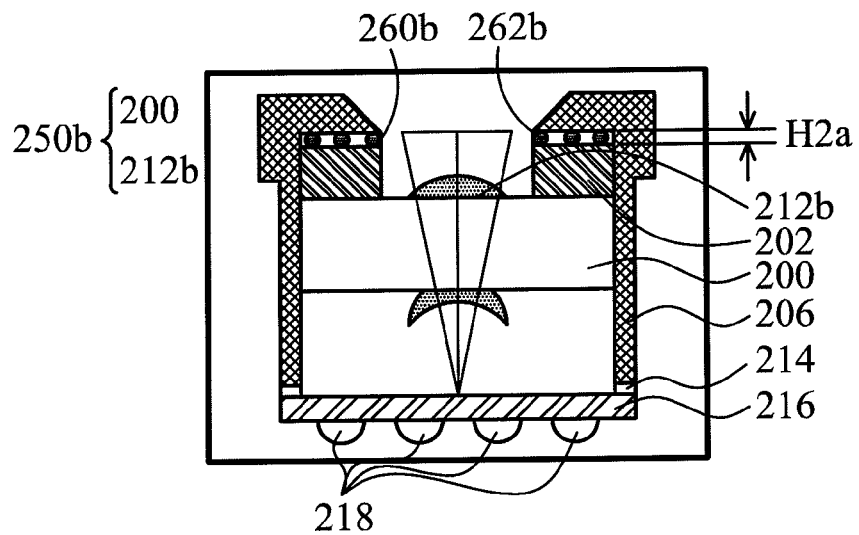
Figure 7C:
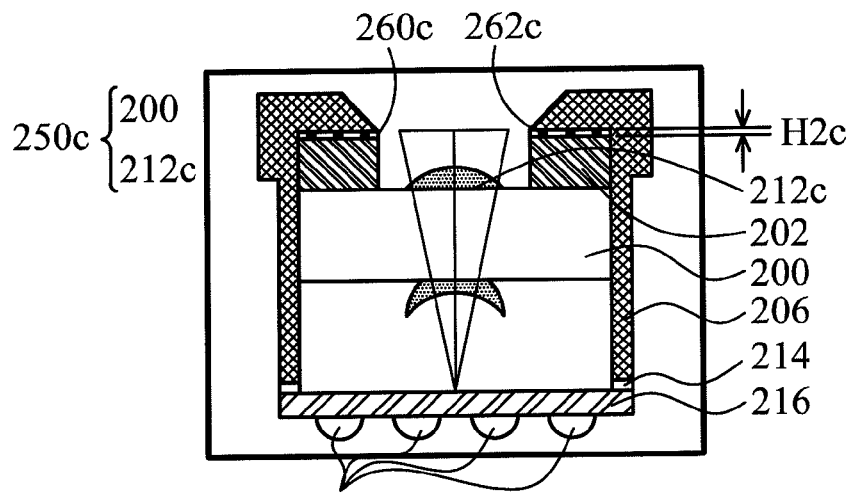

As shown in FIG. 3, after bonding the lens cube 250 to the barrel 206 by the adjustable member 260, another bonding process is performed to bond a top surface 226 (also refer to as a light receiving surface 226) of an image sensor 216 to the barrel 206 only by an adhesive 214. In one embodiment, the image sensor devices 216 may comprise complementary metal-oxide-semiconductor (CMOS) devices or charge-coupled devices (CCDs). Further, as shown in FIG. 3, the barrel 206, which is a single element, may comprises a first segment 206a and a second segment 206b connected with an angle α, wherein the first segment 206a only contacts the compensation ball of the adjustable member 260, and the second segment 206b contacts the top surface 226 of the image sensor 216 and encompasses the outer sidewalls of the lens cube 250. Additionally, FIGS. 5c, 6c and 7c respectively show the barrel bonding the lens cube 250a-250c with three different lens classifications through the adjustable member 260a-260c with three different diameters of the compensation balls 262a-262c. More particular, in FIG. 5c, the barrel 206 is bonded to the lens cube 250a classified as the short focal length by the adjustable member 260 having the compensation ball 262a of a longer compensation focal length H2a, such that the focus of the lens cube 250a is directly on the image sensor 216. Further, in FIG. 6c, the barrel 206 is bonded to the lens cube 250b classified as the on focus by the adjustable member 260 having the compensation ball 262b of a normal compensation focal length H2b, such that the focus of the lens cube 250b is directly on the image sensor 216. Moreover, in FIG. 7c, the barrel 206 is bonded to the lens cube 250c classified as the long focal length by the adjustable member 260 having the compensation ball 262c of a shorter compensation focal length H2c, such that the focus of the lens cube 250c is directly on the image sensor 216. Therefore, the lens cube 250a or 250c with a shorter or longer focal length H2a or H2c can be corrected and integrated into the resulting camera module.

Figure 4:
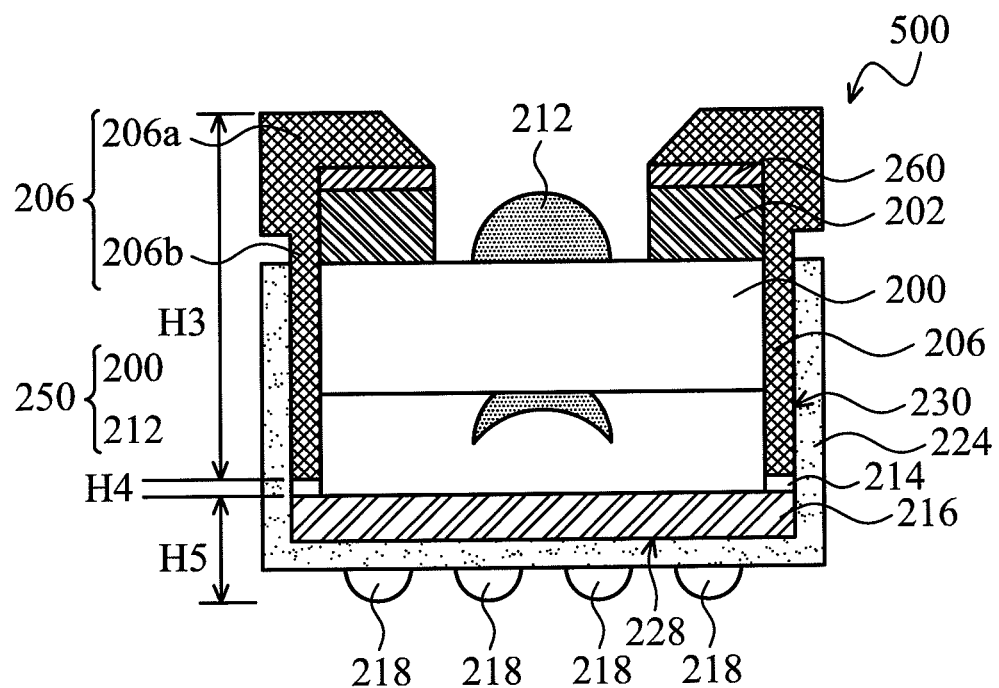

Next, as shown in FIG. 4, a metal can 224 for electromagnetic interference (EMI) shielding is bonded to the image sensor 216, covering a bottom surface 228 of the image sensor 216 and an outer sidewall 230 of the barrel 206, wherein a plurality of solder balls 218 on the bottom surface 228 of the image sensor 216 is exposed from the metal can 224, to complete fabrication of one exemplary embodiment of a camera module 500. It is noted that the process step as shown in FIG. 4 is an optional process.

The exemplary embodiments of a camera module 500 and methods for fabricating the same have various advantages. The compact camera module 500 includes an image sensor 216, a lens cube 250, a barrel 206 and an adjustable member 260. The adjustable member 260 is placed between the lens cube 250 and the barrel 206 and configured to fine-tune the focal length with respect to an image sensor 216, so that even a lens cube 250 with a shorter or longer focal length can still be corrected and integrated into the camera module 500. The adjustable member 260 may include the compensation balls 262a, 262b or 262c that can be made of various diameters. The diameters of compensation balls 262a, 262b or 262c may provide the height or thickness of the adjustable member 260 to compensate focal length difference between a predetermined focal length of the lens cube and a measured focal length of the lens cube 250. The optical lens is not subjected a focal length measurement process before forming a lens cube, such that only one focal length measuring step is performed after the optical lens cube is assembled, thereby saving an amount of required process steps. Additionally, as shown in FIG. 4, a total height HT of the camera module 500 is equal to a sum of the heights of the barrel 206 (H3), the image sensor 216 (H5) and the adhesive 214 (H4). Further, the lens cube 250 is spaced apart from the image sensor 216 by the barrel 206 and the adhesive 214. The lens cube 250 does not directly connect to the image sensor 216. Therefore, the focus of the lens cube 250 can be arbitrary adjusted directly on the image sensor 216 by the adjustable member 260, which is connected between the lens cube 250 and the barrel 206, to compensate for the focal length of the lens cube 250. Note that the total height HT of the camera module 500 is substantially fixed although the lens cube 250 has the focal length variation. Therefore, the camera module 500 with a capability for wide lens focal length variations has improved optical performances and reliability when compared to conventional camera module packages.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera module, comprising:
   a lens cube;
   a barrel bonded to a top surface of the lens cube by an adjustment member; and
   an image sensor bonded to the barrel,
   wherein the adjustment member is constructed by a glue and a compensation ball, and
   wherein the compensation ball has a diameter defined by a difference between a predetermined focal length of the lens cube and a measured focal length of the lens cube.

2. The camera module as claimed in claim 1, further comprising a metal can bonded to a bottom surface of the image sensor and exposed a plurality of solder balls on the bottom surface of the image sensor.

3. The camera module as claimed in claim 2, wherein the metal can covers an outer sidewall of the barrel.

4. The camera module as claimed in claim 1, wherein an aperture of the lens cube is exposed from the barrel.

5. The camera module as claimed in claim 1, wherein the barrel bonds onto a top surface of the image sensor by an adhesive.

6. The camera module as claimed in claim 1, wherein the barrel comprises a first segment and a second segment connected with an angle, and wherein the first segment contacts the compensation ball and the second segment contacts the top surface of the image sensor and encompasses an outer sidewall of the lens cube.

7. The camera module as claimed in claim 1, wherein a total height of the camera module is a sum of the heights of the barrel, the image sensor and the adhesive.

8. The camera module as claimed in claim 1, wherein the lens cube is spaced apart from the image sensor by the barrel.

9. A method for fabricating a camera module, comprising:
   providing a lens cube;
   measuring a focal length of the lens cube;
   classifying the lens cube according to the focal length;
   preparing an adjustment member;
   bonding a top surface of the lens cube to a barrel by the adjustable member; and
   bonding the barrel onto an image sensor,
   wherein the adjustment member is constructed by a compensation ball dispersed in a glue, and
   wherein the compensation ball has a diameter defined by a difference between a predetermined focal length of the lens cube and the focal length of the lens cube.

10. The method for fabricating a camera module as claimed in claim 9, further comprising:
    bonding a metal can to a bottom surface of the image sensor, exposing a plurality of solder balls on the bottom surface of the image sensor.

11. The method for fabricating a camera module as claimed in claim 9, wherein bonding the top surface of the lens cube to the barrel by the adjustable member further comprising:
    disposing an adjustable member on the top surface of the lens cube;
    pressing the barrel on the top surface of the lens cube; and
    curing the adjustable member.

12. The method for fabricating a camera module as claimed in claim 9, wherein the barrel bonds onto the image sensor by an adhesive.

13. The method for fabricating a camera module as claimed in claim 12, wherein a total height of the camera module is a sum of the heights of the barrel, the image sensor and the adhesive.

14. The method for fabricating a camera module as claimed in claim 9, wherein the lens cube is spaced apart from the image sensor by the barrel.

15. The method for fabricating a camera module as claimed in claim 9, wherein the lens cube is not subjected a focal length measurement process before forming a lens cube.

* * * * *